June 2, 1959 D. N. MacDONALD 2,889,491

TAPE STORAGE BIN

Filed Oct. 22, 1954 2 Sheets-Sheet 1

INVENTOR.
DUNCAN N. MAC DONALD
BY
Christie, Parker & Hale
ATTORNEYS

June 2, 1959 D. N. MacDONALD 2,889,491

TAPE STORAGE BIN

Filed Oct. 22, 1954 2 Sheets-Sheet 2

INVENTOR.
DUNCAN N. MacDONALD

BY

Christie, Parker & Hale

ATTORNEYS

United States Patent Office 2,889,491

Patented June 2, 1959

2,889,491

TAPE STORAGE BIN

Duncan N. MacDonald, Arcadia, Calif., assignor, by mesne assignments, to Burroughs Corporation, Detroit, Mich., a corporation of Michigan Application October 22, 1954, Serial No. 463,891

11 Claims. (Cl. 317—2)

This invention relates to storage bins and more particularly to storage bins for storing an elongated strip in serpentine loops.

In magnetic tape recording systems, as well as in data processing equipment utilizing perforated tapes, the conventional practice is to store the tape on reels. However, where it is necessary to locate quickly a selected portion of the tape, the inertia of the storage reels limits the time required to move the selected section adjacent the reading and writing transducers.

One way to overcome the problem of the inertia of the tape reels is to store the tape in narrow open-top bins in which the tape is folded back and forth in serpentine loops. Through the use of two such bins the tape may be rapidly transported past an operational zone, including the reading and writing transducers, from one bin to the other. However, the use of such tape bins has been seriously limited because the tape has a tendency to become fouled due to accumulated electrostatic charges on the tape which cause the loops to repel one another. In an attempt to overcome the difficulties encountered in the use of tape bins, it has been proposed to coat the back of the tape, using aluminum or metallic coating. Being conductive, the coating carries the electrostatic charge away. However, it has been found that the aluminum coating wears off and clogs the transport mechanism. In addition, the air trapped beneath the tape when the bin is being loaded impedes the free fall of the tape into the bin.

In accordance with my invention the aforementioned difficulties encountered in prior art tape bins are substantially eliminated.

In one embodiment of my invention a tape bin is provided in which a front plate and a back plate define the tape storage chamber, at least one of the plates includes an electrically conductive surface for carrying electrostatic charges away from the tape, and at least one of the plates is perforated with an array of apertures through which there is free passage of air to and from the tape bin.

A better understanding of my invention may be had upon a reading of the following detailed description when taken in conjunction with the drawings, in which.

Figure 1:
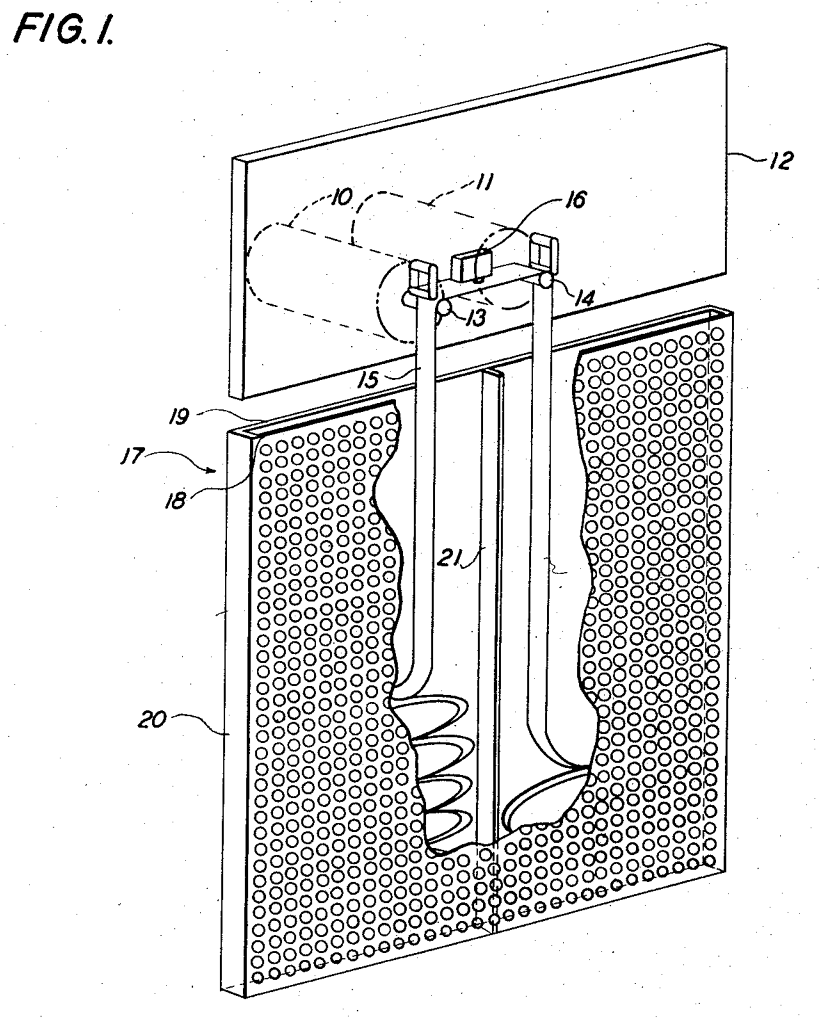
Fig. 1 is a perspective view, partially broken away, of a tape transport system including an embodiment of my invention.

In Fig. 1 there is shown a magnetic tape recording system in which a tape transport system, including motors 10 and 11, is mounted on a panel 12. The motors 10 and 11 drive the capstans 13 and 14, which in turn drive the tape 15 past an operational zone including a recording and reading transducer 16.

The tape bin 17, in which the tape 15 is stored, includes a front plate 18 and a back plate 19 which are held in spaced parallel relation at a distance slightly greater than the width of the tape 15. The space between the front plate 18 and the back plate 19 may be enclosed by a strip 20 running around three sides of the plates. This leaves the tape bin 17 open at the top and by means of a partition 21 the bin is divided into a left-hand section in which the tape 15 dropping from the capstan 13 may be stored in serpentine loops, and a right-hand section in which the tape 15 dropping from the capstan 14 may be stored in serpentine loops.

The plates 18 and 19 may be made of any suitable material but at least one of them must have an electrically conductive surface on the inside of the bin, so that when the edges of the tape make contact with the plates 18 and 19, any accumulated electrostatic charge on the tape will be carried away. If necessary, the electrically conductive surface may be grounded.

In one successful embodiment metal plates were used. However, it will be appreciated that plates of non-conducting material having a deposited electrically conductive surface may be employed as well. In addition, it is essential that at least one of the plates be perforated in an array of apertures throughout the portion of the chamber in which the serpentine loops are to be stored, so that the tape bin may be unloaded or loaded rapidly with a free passage of air between the loops. Preferably the inner surfaces of the plates 18 and 19 should be as smooth as possible in order to avoid damaging the edges of the tape, as well as to decrease friction between the tape and the tape bin.

Figure 2:
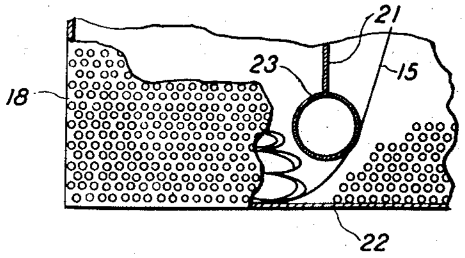
Fig. 2 is a plan view, partially broken away, of a section of an alternative embodiment of the invention which is adapted to store an endless tape.

In tape handling systems employing an endless tape, the apparatus of Fig. 1 may be modified as shown in Fig. 2 in which an opening is left between the partition 21 and the bottom of the tape bin 22. To avoid friction between the tape 15 and the partition 21 a cylindrical member 23 may be attached to the lower end of the partition.

The plate 18 of Fig. 2 includes apertures which are shown to the approximate scale of those employed in one successful embodiment. Punched perforated metal plates made of stainless steel were used, but it should be noted that where the perforations are punched, the smoother side of the plate should be mounted towards the inside of the bin, in order to avoid friction between the tape and the tape bin due to the burrs produced by the punching process.

Figure 3:
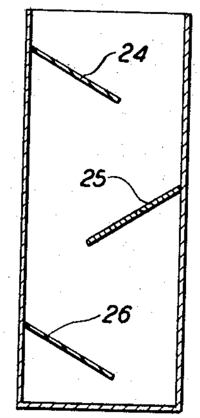
Fig. 3 is a sectional view of a tape bin of the invention including baffles for controlling the fall of the tape into the bin.

In Fig. 3 there is shown one section of a tape bin which may be used where it is desirable to cushion the fall of the tape into the tape bin. A top baffle 24, an intermediate baffle 25, and a lower baffle 26 are adapted to brake the fall of the tape when it is being loaded in the bin. It has been found that these baffles effectively control the loop density in the bin so that when the bin is fully loaded the loops at the bottom of the bin are not unduly compressed.

Figure 4:
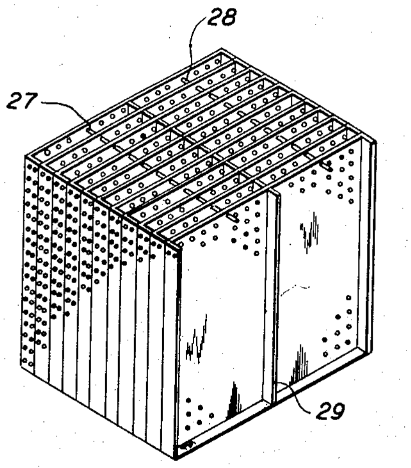
Fig. 4 is a perspective view of a multiple tape storage bin.

In one type of memory system for use in conjunction with digital computers, or the like, described in my co-pending U.S. patent application, filed May 9, 1955, Serial No. 506,875, and entitled "Information Storage System," a plurality of separate tapes are stored side by side, and a traveling carriage moves the transport mechanism and the transducers adjacent a selected tape. One type of multiple tape storage bin having a simplified construction which may be used in conjunction with the apparatus of the aforementioned co-pending application is shown in Fig. 4. In the tape bin of Fig. 4, the front plate of one bin forms the back plate for an adjacent bin, and the edges of each plate are bent to form the sides and bottom of the bin. A plurality of the plates may be held together by the throughbolts 27 and 28. A partition 29 may be slotted to fit into corresponding slots in the plates so as to divide each of the bins into two sections.

Figure 5:
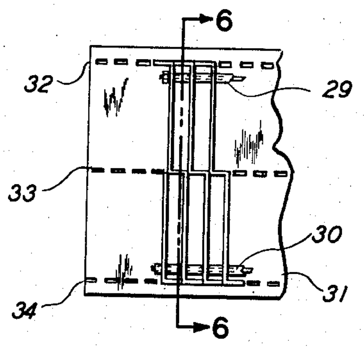
Fig. 5 is a top view of a multiple tape storage bin of simplified construction.
Figure 6:
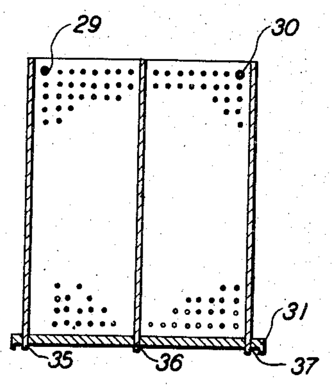
Fig. 6 is a sectional view of the embodiment of Fig. 5 taken along line 6—6.

Figs. 5 and 6 show another simplified construction of a tape bin in which each of the plates is formed so that a plurality of the plates may be joined together in a manner in which the partition is an integral part of the plate itself. The plates may be held together by throughbolts 29 and 30. The bottom of the multiple tape storage bin of Figs. 5 and 6 may comprise a bottom plate 31 having three rows of slots 32, 33 and 34 which are adapted to receive tabs 35, 36 and 37 extending downwardly from the formed plates. The formed plates may be fastened to the bottom plate 31 by bending the tabs beneath the bottom plate.

If punched plates are used in the multiple tape storage bin of either Fig. 4 or Fig. 5, the punching burrs should be removed, as by electro-polishing, to reduce friction between the tape and the tape bin.

In summary, the improved tape storage bin of my present invention provides for the storage of tape in a manner in which the tape may be rapidly transported past an operational zone without the use of storage reels or the disadvantages encountered in the use of prior art tape bins.

I claim:

1. A tape bin for storing an elongated strip in serpentine loops, including in combination a front plate having a conductive surface, a back plate having a conductive surface, means holding the front plate in spaced parallel relation to the back plate, and at least one of the plates being perforated in a regular array of apertures to allow the free passage of air between the serpentine loops.

2. A tape storage bin, including a pair of plates which are held in parallel relation which are adapted to hold an elongated strip in serpentine loops, an electrically conductive surface on the inner side of at least one of the plates, and at least one of the plates being perforated in a regular array of apertures to allow the free passage of air between the serpentine loops.

3. A bin for storing an elongated strip of predetermined width in serpentine loops, including in combination a front plate, a back plate, means holding the front plate in spaced parallel relation to the back plate at a distance slightly greater than said predetermined width, an electrically conductive surface on the inner side of at least one of the plates, and at least one of the plates being perforated in an array of apertures to allow the free passage of air between the serpentine loops.

4. A tape storage bin for storing an elongated strip in serpentine loops in a chamber defined by the combination of a pair of plates held in parallel relation, the edges of which define the boundary of the bin, means enclosing the edges of the plates, an electrically conductive surface on the chamber side of at least one of the plates, and at least one of the plates being perforated in an array of apertures to allow the passage of air through the plate when the bin is being loaded and unloaded.

5. Apparatus in accordance with claim 4, including at least one baffle plate mounted between the back plate and the front plate for braking the fall of the elongated strip when the tape bin is being loaded.

6. A tape storage bin for storing an elongated strip in serpentine loops in a chamber defined by the combination of a front plate having a chamber surface which is electrically conducting, a back plate, means holding the back plate in spaced parallel relation to the front plate, and at least one of the plates being perforated in an array of apertures to allow the free passage of air through the plate to the serpentine loops.

7. Apparatus in accordance with claim 6, including at least one baffle plate mounted between the back plate and the front plate for braking the fall of the elongated strip when the tape bin is being loaded.

8. A multiple tape storage bin for storing a plurality of elongated strips, including in combination a plurality of channel-shaped perforated metal plates; and means joining the plurality of plates in stacked position to provide a multiple section tape storage bin, in each section of which an elongated strip may be stored in serpentine loops.

9. A multiple tape storage bin for storing a plurality of elongated strips, including the combination of a plurality of perforated metal plates, each of which is formed to provide an edge portion for one tape bin section, a divider between said one tape bin section and an adjacent tape bin section, a partition separating said adjacent tape bin section into two parts, a divider between said adjacent tape bin section and a third tape bin section, and an edge portion for said third tape bin section; means joining said plurality of plates in stacked position; and a bottom plate attached at right angles to all of said plates whereby a multiple section tape bin is provided in which each section is separated into two parts.

10. An open-ended tape storage bin for storing an elongated strip in serpentine loops, including the combination of a pair of plates held in parallel relation, the side edges and bottom edges of which define the boundary of the bin; a pair of sides enclosing the side edges of the plates; a bottom enclosing the bottom edges of the plates; an electrically conductive surface on at least one of the plates; at least one of the plates being perforated in an array of apertures to allow the passage of air through the plate while the bin is being loaded and unloaded; and a partition fastened between the plates and extending along the length of the tape bin for dividing the tape bin into a right-hand section and a left-hand section.

11. A tape storage bin in accordance with claim 10 in which the partition extends from the open end of the tape bin and is shorter than the plates, whereby an elongated strip being stored may be transferred from said right-hand section to said left-hand section and from said left-hand section to said right-hand section between the partition and the bottom of the tape bin.

References Cited in the file of this patent

UNITED STATES PATENTS

| | | |
|---|---|---|
| 1,056,507 | Cronjager | Mar. 18, 1913 |
| 1,162,419 | Deventer | Nov. 30, 1915 |
| 1,206,357 | Nusbaum | Nov. 28, 1916 |
| 1,530,704 | Thompson | Mar. 24, 1925 |
| 1,744,004 | Hunt | Jan. 14, 1930 |
| 2,259,517 | Drenkard | Oct. 21, 1941 |